US008753415B2

(12) United States Patent
Coulonvaux et al.

(10) Patent No.: US 8,753,415 B2
(45) Date of Patent: *Jun. 17, 2014

(54) AIR CLEANER HAVING ANTI-ROTATIONAL ARRANGEMENTS AND METHODS

(71) Applicant: Donaldson Company, Inc., Minneapolis, MN (US)

(72) Inventors: Paul R. Coulonvaux, Brussels (BE); Johan G. Dewit, Hamme-Mile (BE); Tom Hg Vranken, Kessel-Lo (BE)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/897,808

(22) Filed: May 20, 2013

(65) Prior Publication Data

US 2013/0247526 A1 Sep. 26, 2013

Related U.S. Application Data

(63) Continuation of application No. 13/439,261, filed on Apr. 4, 2012, now Pat. No. 8,444,735, which is a continuation of application No. 12/063,702, filed as application No. PCT/US2006/031812 on Aug. 15, 2006, now Pat. No. 8,163,056.

(51) Int. Cl.
*B01D 39/00* (2006.01)
*B01D 46/00* (2006.01)

(52) U.S. Cl.
USPC ............... 55/498; 55/510; 55/502; 55/503; 55/504; 55/521

(58) Field of Classification Search
USPC ............... 55/510, 498, 502–504, 521
See application file for complete search history.

(56) References Cited

U.S. PATENT DOCUMENTS 1,463,006 A * 7/1923 Dardani ............... 210/312
3,002,870 A 10/1961 Belgarde et al.
(Continued)

FOREIGN PATENT DOCUMENTS

BE 1011567 11/1999
DE 198 49 089 A1 4/2000
(Continued)

OTHER PUBLICATIONS

Communication of Notice of Opposition from the European Patent Office; Application 05107531.5; Notice of Opposition from M&H GmbH; Grounds for Opposition from M&H GmbH; dated Oct. 19, 2011; 40 pgs; with English Translation of M&H GmbH Grounds for Opposition; dated Oct. 19, 2011; 26 pages; and Feature Analysis in German with English Translation.

(Continued)

*Primary Examiner* — Amber Orlando
(74) *Attorney, Agent, or Firm* — Merchant & Gould P.C.

(57) ABSTRACT

An air cleaner having a housing body and a removable cover and a filter element, in which the cover and the filter element rotationally interfere with each other by engagement between an inside surface of the cover and an outer radial periphery of the filter element. A filter element includes a pair of end caps, filter media, and an outer wall on the end cap circumscribing the filter media, in which the outer wall is non-circular. A method of installing a filter element into a housing includes orienting a cover over an element and a housing body by engaging an inside surface of the cover and an outer radial periphery of the filter element to rotationally interfere with each other.

10 Claims, 16 Drawing Sheets

(56) References Cited

U.S. PATENT DOCUMENTS

| | | | |
|---|---|---|---|
| 3,160,488 A | 12/1964 | Wilber | |
| 3,169,844 A | 2/1965 | Young | |
| 3,290,870 A | 12/1966 | Jensen | |
| 3,342,021 A | 9/1967 | Yelinek et al. | |
| 3,357,163 A * | 12/1967 | Burger et al. | 55/385.3 |
| 3,413,780 A | 12/1968 | Amlott et al. | |
| 3,423,909 A | 1/1969 | Bennett et al. | |
| 3,452,519 A | 7/1969 | Bianchetta | |
| 3,488,928 A | 1/1970 | Tarala | |
| 3,616,618 A | 11/1971 | Gronholz et al. | |
| 3,710,560 A | 1/1973 | Maddocks | |
| 3,716,436 A | 2/1973 | Pall et al. | |
| 4,006,000 A | 2/1977 | Tortorici et al. | |
| 4,062,781 A | 12/1977 | Strauss et al. | |
| 4,129,429 A | 12/1978 | Humbert, Jr. et al. | |
| 4,222,755 A | 9/1980 | Grotto | |
| 4,261,710 A * | 4/1981 | Sullivan | 95/282 |
| 4,278,455 A | 7/1981 | Nardi | |
| 4,299,699 A | 11/1981 | Boogay | |
| 4,303,426 A | 12/1981 | Battis | |
| 4,312,651 A | 1/1982 | Esaki et al. | |
| 4,349,363 A | 9/1982 | Patel et al. | |
| 4,498,915 A | 2/1985 | Witchell | |
| 4,588,426 A | 5/1986 | Virgille et al. | |
| 4,617,118 A * | 10/1986 | Smart | 210/232 |
| 4,728,423 A | 3/1988 | Kuwajima | |
| 4,818,261 A | 4/1989 | Beckon | |
| 4,838,901 A | 6/1989 | Schmidt et al. | |
| 4,923,487 A | 5/1990 | Bogart et al. | |
| 4,950,317 A | 8/1990 | Dottermans | |
| 5,071,456 A | 12/1991 | Binder et al. | |
| 5,112,417 A | 5/1992 | Sayles | |
| 5,116,499 A | 5/1992 | Deibel | |
| 5,118,417 A | 6/1992 | Deibel | |
| 5,120,337 A | 6/1992 | Benzler et al. | |
| 5,137,557 A | 8/1992 | Behrendt et al. | |
| 5,167,683 A | 12/1992 | Behrendt et al. | |
| 5,174,907 A | 12/1992 | Chown et al. | |
| 5,211,846 A | 5/1993 | Kott et al. | |
| 5,250,179 A | 10/1993 | Spearman | |
| 5,277,157 A | 1/1994 | Teich | |
| 5,290,445 A | 3/1994 | Buttery | |
| 5,457,945 A | 10/1995 | Adiletta | |
| 5,484,466 A | 1/1996 | Brown et al. | |
| 5,547,480 A | 8/1996 | Coulonvaux | |
| 5,548,893 A | 8/1996 | Koelfgen | |
| 5,556,440 A | 9/1996 | Mullins et al. | |
| 5,601,717 A | 2/1997 | Villette et al. | |
| 5,605,555 A | 2/1997 | Patel et al. | |
| 5,605,625 A | 2/1997 | Mills | |
| 5,632,791 A | 5/1997 | Oussoren et al. | |
| 5,685,985 A | 11/1997 | Brown et al. | |
| 5,720,788 A | 2/1998 | Puckett et al. | |
| 5,720,790 A | 2/1998 | Kometani et al. | |
| 5,730,769 A | 3/1998 | Dungs et al. | |
| 5,736,040 A | 4/1998 | Duerrstein et al. | |
| 5,741,421 A | 4/1998 | Erdmannsdoerfer et al. | |
| 5,753,117 A | 5/1998 | Jiang | |
| 5,755,842 A | 5/1998 | Patel et al. | |
| 5,755,844 A | 5/1998 | Arai et al. | |
| 5,800,581 A | 9/1998 | Gielink et al. | |
| 5,865,863 A | 2/1999 | DeSousa et al. | |
| 5,893,937 A | 4/1999 | Moessinger | |
| 5,897,676 A | 4/1999 | Engel et al. | |
| 5,951,729 A | 9/1999 | Ernst et al. | |
| 5,972,063 A * | 10/1999 | Dudrey et al. | 55/485 |
| 5,984,109 A | 11/1999 | Kanwar et al. | |
| 6,051,042 A | 4/2000 | Coulonvaux | |
| 6,090,177 A | 7/2000 | Moessinger et al. | |
| 6,099,606 A | 8/2000 | Miller et al. | |
| 6,149,700 A | 11/2000 | Morgan et al. | |
| 6,152,979 A | 11/2000 | Cappuyns | |
| 6,290,739 B1 | 9/2001 | Gieseke et al. | |
| 6,334,887 B1 * | 1/2002 | Coulonvaux | 95/273 |
| 6,383,244 B1 | 5/2002 | Wake et al. | |
| 6,391,193 B1 | 5/2002 | Luka | |
| 6,416,561 B1 | 7/2002 | Kallsen et al. | |
| 6,461,397 B1 | 10/2002 | Billiet | |
| 6,572,667 B1 | 6/2003 | Greif et al. | |
| 6,626,299 B1 | 9/2003 | Brown et al. | |
| 6,652,614 B2 | 11/2003 | Gieseke et al. | |
| 6,679,990 B2 * | 1/2004 | Reinhart | 210/232 |
| 6,736,874 B2 | 5/2004 | Rieger et al. | |
| 6,837,920 B2 * | 1/2005 | Gieseke et al. | 95/273 |
| 6,955,701 B2 * | 10/2005 | Schrage | 55/498 |
| 6,986,805 B2 | 1/2006 | Gieseke et al. | |
| 7,291,198 B2 | 11/2007 | Gieseke et al. | |
| 7,314,555 B2 | 1/2008 | Koehler et al. | |
| 7,357,867 B2 | 4/2008 | Knight et al. | |
| 7,513,373 B2 * | 4/2009 | Kramer | 210/440 |
| 7,524,349 B2 | 4/2009 | Schrage et al. | |
| 7,610,904 B2 | 11/2009 | Treier et al. | |
| 7,614,504 B2 * | 11/2009 | South et al. | 210/443 |
| 7,662,203 B2 | 2/2010 | Scott et al. | |
| 8,163,056 B2 * | 4/2012 | Coulonvaux et al. | 55/498 |
| 2002/0073665 A1 | 6/2002 | Gieseke et al. | |
| 2004/0134171 A1 | 7/2004 | Scott et al. | |
| 2008/0092501 A1 * | 4/2008 | Sporre et al. | 55/493 |

FOREIGN PATENT DOCUMENTS

| | | |
|---|---|---|
| DE | 203 20 121 UI | 4/2004 |
| EP | 0 230 991 A2 | 8/1987 |
| EP | 0 329 659 B1 | 8/1989 |
| EP | 1 281 426 | 2/2003 |
| EP | 1 123 460 BI | 8/2003 |
| EP | 1 754 525 | 1/2011 |
| GB | 1 335 355 | 10/1973 |
| JP | 55-091921 | 6/1980 |
| JP | 60-164665 | 8/1985 |
| JP | 4-081622 | 7/1992 |
| JP | 6-60760 | 8/1994 |
| NL | 1013824 C2 | 6/2001 |
| WO | WO 93/10881 | 6/1993 |
| WO | WO 98/11977 | 3/1998 |
| WO | WO 99/42719 | 8/1999 |
| WO | WO 00/23166 | 4/2000 |
| WO | WO 02/17766 A2 | 3/2002 |
| WO | WO 02/081052 A1 | 10/2002 |
| WO | WO 03/018170 A1 | 3/2003 |
| WO | WO 03/053540 A1 | 7/2003 |

OTHER PUBLICATIONS

European Search Report mailed Sep. 3, 2010.

* cited by examiner

AIR CLEANER HAVING ANTI-ROTATIONAL ARRANGEMENTS AND METHODS

This application is a Continuation of U.S. application Ser. No. 13/439,261 filed on Apr. 4, 2012, issued as U.S. Pat. No. 8,444,735; application Ser. No. 13/439,261 is a continuation of U.S. application Ser. No. 12/063,702, filed on 21 Jul. 2008 and issued as U.S. Pat. No. 8,163,056; application Ser. No. 12/063,702 is a National Stage of PCT International Application No. PCT/US2006/031812, filed on 15 Aug. 2006 in the name of Donaldson Company, Inc., a U.S. national corporation, applicant for the designation of all countries except the US, and Paul R. Coulonvaux, Johan G. DeWit, and Tom H G Vranken, all citizens of Belgium, applicants for the designation of the US only, and claims priority to European Patent Application No. 05107531.5, filed 16 Aug. 2005.

TECHNICAL FIELD

This application relates to air cleaners, including housings and filter elements. In particular, this application relates to air cleaners for use in filtering intake air for engines.

BACKGROUND

In general, the machinery, vehicles, or other equipment that operate with internal combustion engines require filtration systems for air intake to the engine. Such air filtration arrangements, typically referenced by the term "air cleaner", are generally positioned to separate dust and other components from the air as it is drawn into the engine. Air cleaners typically include a housing and a replacement filter element arrangement. Typically, the air cleaners are designed such that the filter elements can be removed and replaced. Air compressor systems typically include two air lines that need filtration: the intake air to the engine, and the intake air to the compressed air storage. Air cleaners are desirable for these systems as well.

Sometimes, in certain environments, air cleaners are in environments that subject them to substantial vibration. For example, if the air cleaner is used for an over-the-highway truck, the contact between the truck and the road can cause vibration. Vibration can be even more exacerbated in off-road vehicles. A combination of factors can contribute to vibration on the air cleaner.

When there is vibration, the filter element may move within the air cleaner housing. Sometimes, the filter element can rotate within the housing. The filter element moving within the housing is undesirable because it may cause the seal between the filter element and the housing to be released or otherwise compromised. An air cleaner to address this problem is needed.

SUMMARY

In one aspect, a filter element is provided that has structure to prevent rotation of the filter element when installed in a housing. In one embodiment, the filter element has first and second end caps, with the second end cap including an outer wall circumscribing a tubular extension of filter media, and the outer wall is non-circular.

In certain preferred embodiments, the outer wall defines at least one apex. In some embodiments, the outer wall defines a plurality of apices. In some embodiments, the outer wall is polygon-shaped. Furthermore, in some embodiments, the outer wall has the shape of a regular polygon.

In one embodiment, the outer wall has a first section and a second section extending from the first section, with the first section having the non-circular shape. The second section has a circular shape.

In some embodiments, the second end cap includes an axial portion having a central region with a closed recess projecting into an open filter interior and a projection extending axially from the central region.

In another aspect, an air cleaner is provided. The air cleaner includes a housing body and a removable cover, and a filter element is operably mounted in the housing body. The cover and the filter element rotationally interfere with each other by engagement between an inside surface of the cover and an outer radial periphery of the filter element.

In one embodiment, the outer radial periphery of the filter element is non-circular, and the inside surface of the cover is non-circular.

In one embodiment, the filter element has first and second end caps with the first end cap having an opening and a sealing portion extending radially into the opening to form a radial seal with the housing body.

In one embodiment, the outer wall of a second end cap defines a plurality of apices, and the cover inside surface defines a plurality of apices. In some embodiments, the outer wall of the end cap defines a regular polygon, and the cover inside surface defines a regular polygon.

In one embodiment, the second end cap includes an axial portion having a central region with a closed recess projecting into an open filter interior, and a projection extending axially from the central region. The cover includes a protrusion projecting into the closed recess of the second end cap. In one embodiment, the cover defines a recess oriented to receive the projection of the second end cap.

In some embodiments, the air cleaner further includes a safety element oriented in an interior of the filter element.

In another aspect, a method of installing a filter element into a housing is provided. The method includes operably orienting the filter element into a housing body and orienting a cover over the element and the housing body. The step of orienting a cover over the element and the housing body includes engaging an inside surface of the cover and an outer radial periphery of the filter element to rotationally interfere with each other.

In some embodiments, the step of engaging the cover inside surface and the filter element outer radial periphery to rotationally interfere with each other includes engaging an end cap on the filter element having an outer wall with a regular polygon shape against the cover inside surface, and the cover inside surface also has a regular, polygon shape.

DETAILED DESCRIPTION

Figure 1:
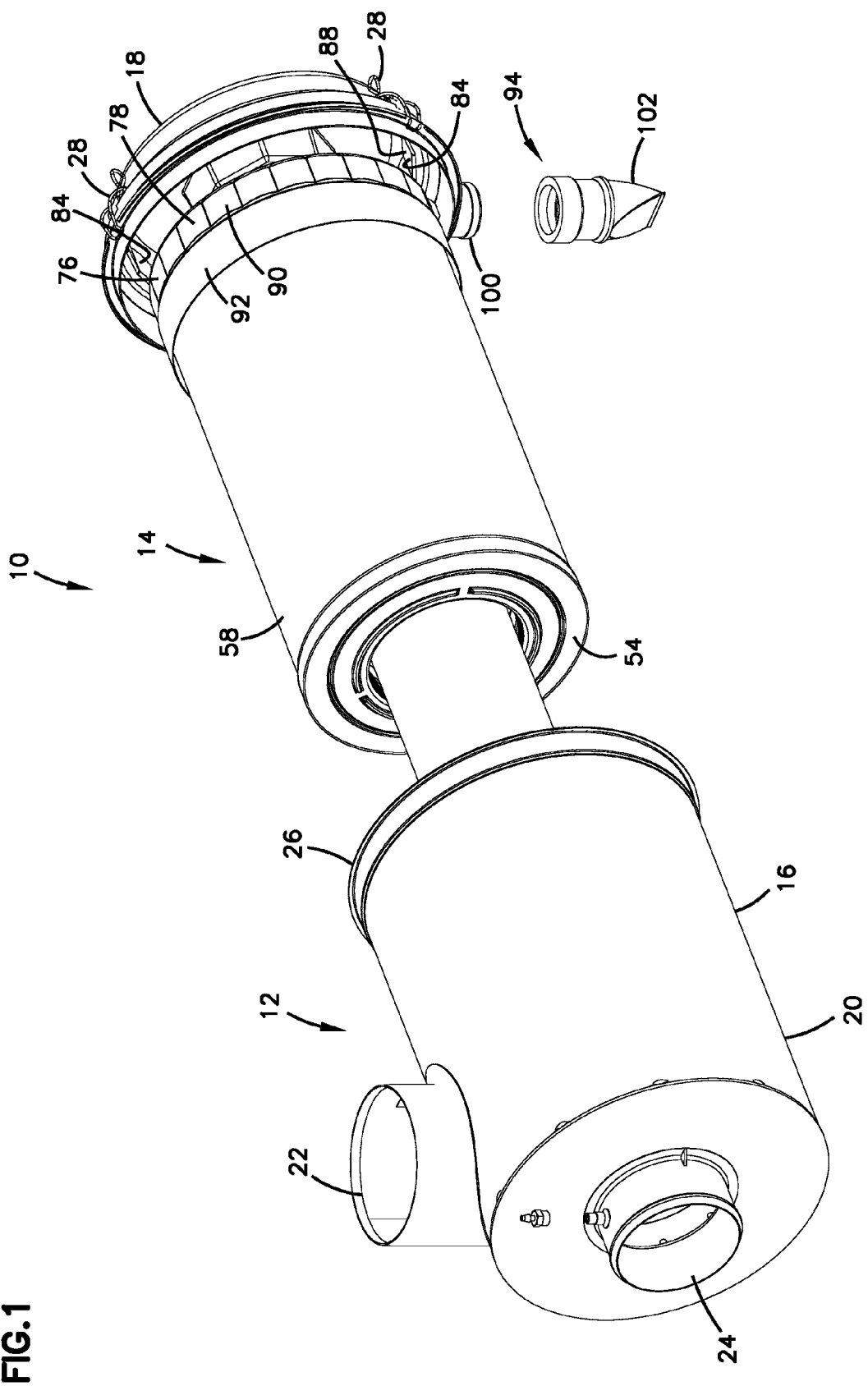
FIG. 1 is an exploded, perspective view of an air cleaner including a housing and a filter element, constructed according to principles of this disclosure.
Figure 2:
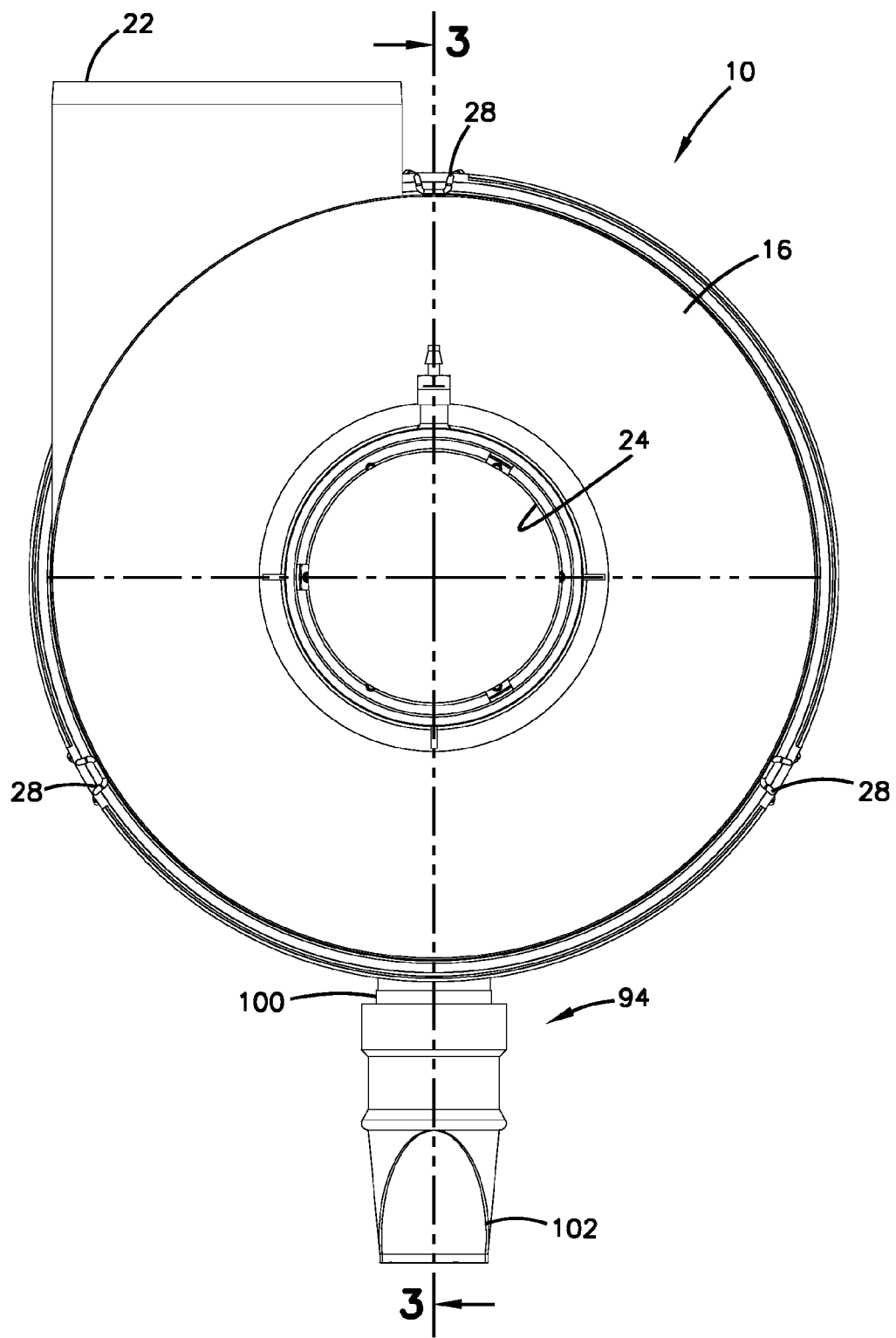
FIG. 2 is an end elevational view of the air cleaner of FIG. 1 in an assembled orientation.

In FIG. 1, an air cleaner 10 is shown in exploded view. The air cleaner 10 depicted includes a housing 12 and a removable and replaceable filter element 14. In the one shown, the housing 12 includes a housing body 16 and a removable service cover 18. The cover 18 provides for service access to an interior of the housing body 16 for servicing. For an air cleaner 10 of the general type depicted in FIG. 1, servicing generally involves dismounting and removing from the housing 12 at least one filter element, such as filter element 14 depicted, either for refurbishing or replacement.

The housing 12 depicted includes an outer wall 20, an air inlet 22, and an air outlet 24. For the embodiment depicted, the inlet 22 and the outlet 24 are both in the housing body 16. In other embodiments, at least one of the inlet 22 or outlet 24 can be part of the cover 18. In typical use, ambient or unfiltered air enters the air cleaner 10 through the inlet 22. Within the air cleaner 10, the air is passed through the filter element 14 to obtain a desirable level of particulate removal. The filtered air then passes outwardly from the air cleaner 10 through the outlet 24 and is directed by appropriate duct work or conduits to an inlet of an air intake for an associated engine, or compressor, or other system.

The particular air cleaner 10 depicted has outer wall 20 defining a barrel shape or generally cylindrical configuration. In this particular configuration, the outlet 24 can be described as an axial outlet because it generally extends in the direction of and circumscribes a longitudinal central axis defined by the filter element 14.

Figure 9:
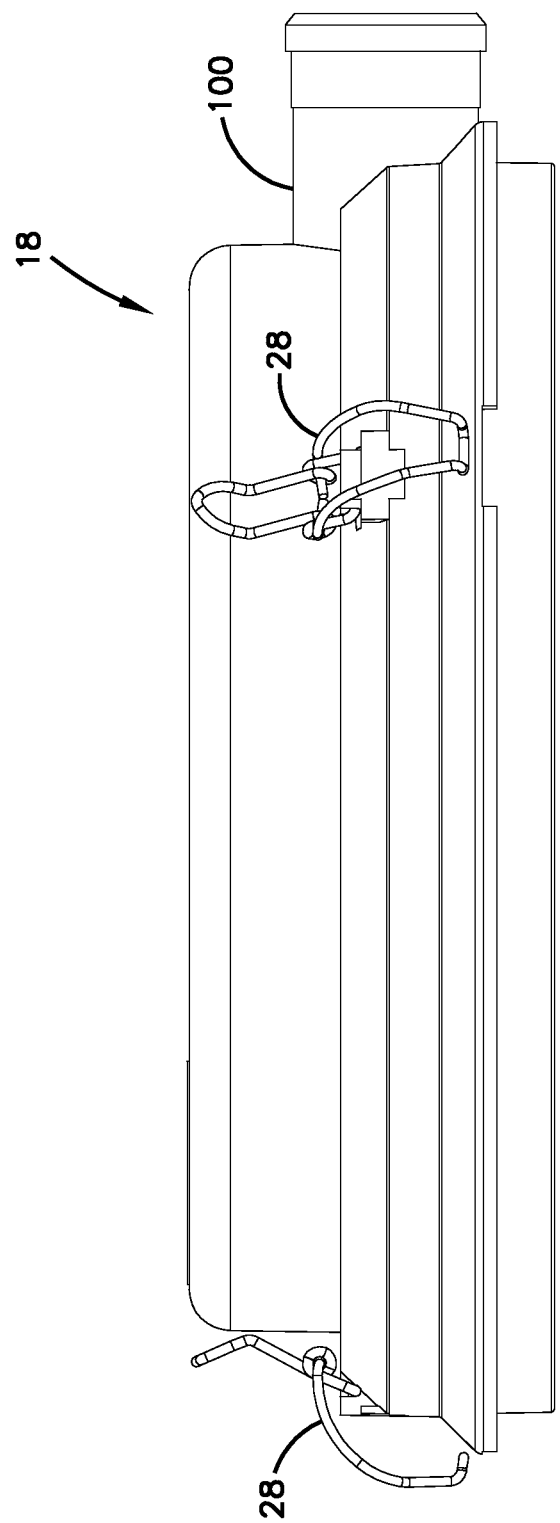
FIG. 9 is a side elevational view of the housing cover used in the assembly of FIG. 1.
Figure 10:
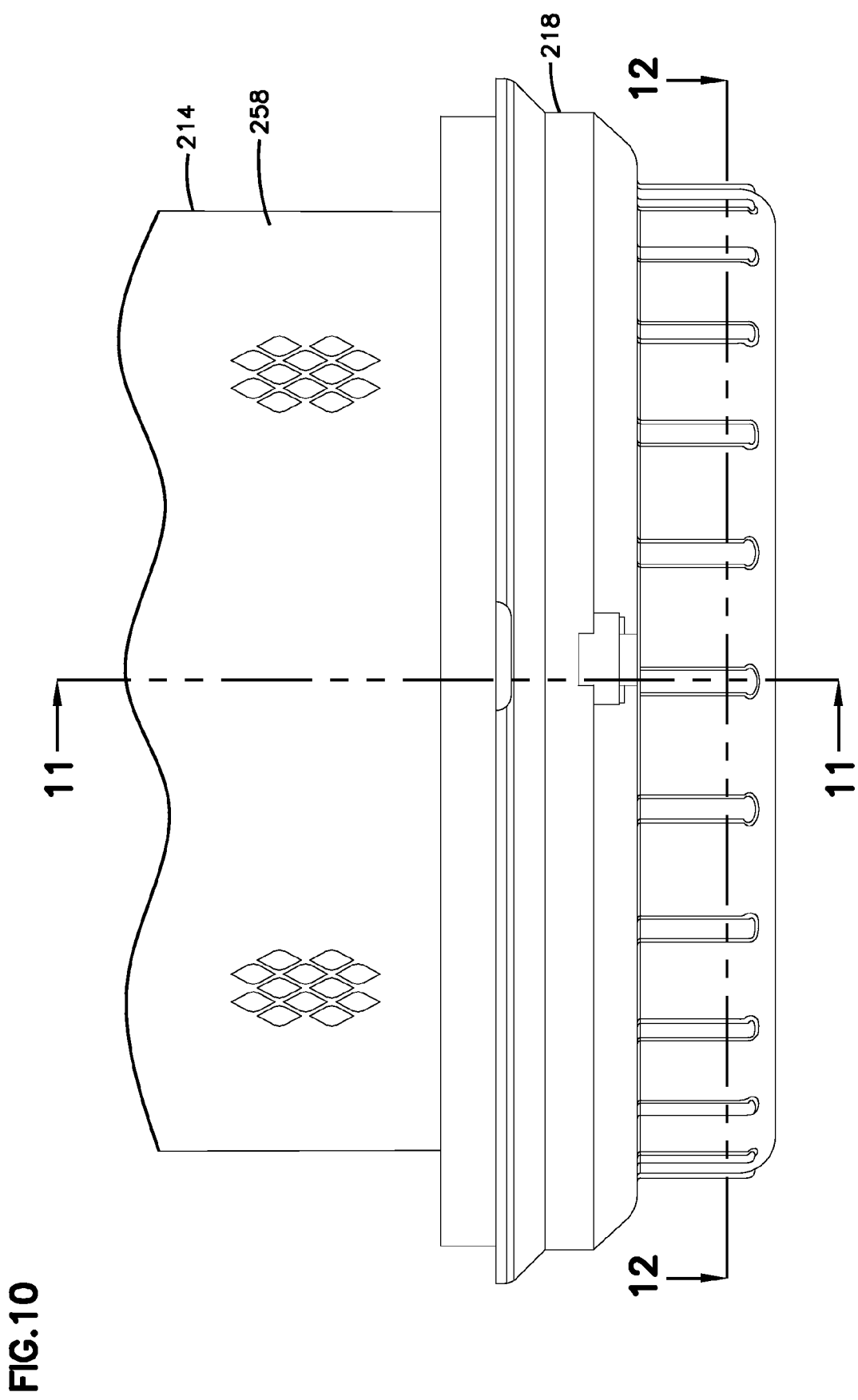
FIG. 10 is a schematic, partial side-elevational view of a second embodiment of a filter element installed in a housing cover.

The service cover 18 generally fits over an open end 26 of the housing body 16. In the particular arrangement shown, the cover 18 is secured in place over the end 26 by latches 28. FIG. 9 depicts a side elevational view of one embodiment of the service cover 18, including the latches 28.

Figure 3:
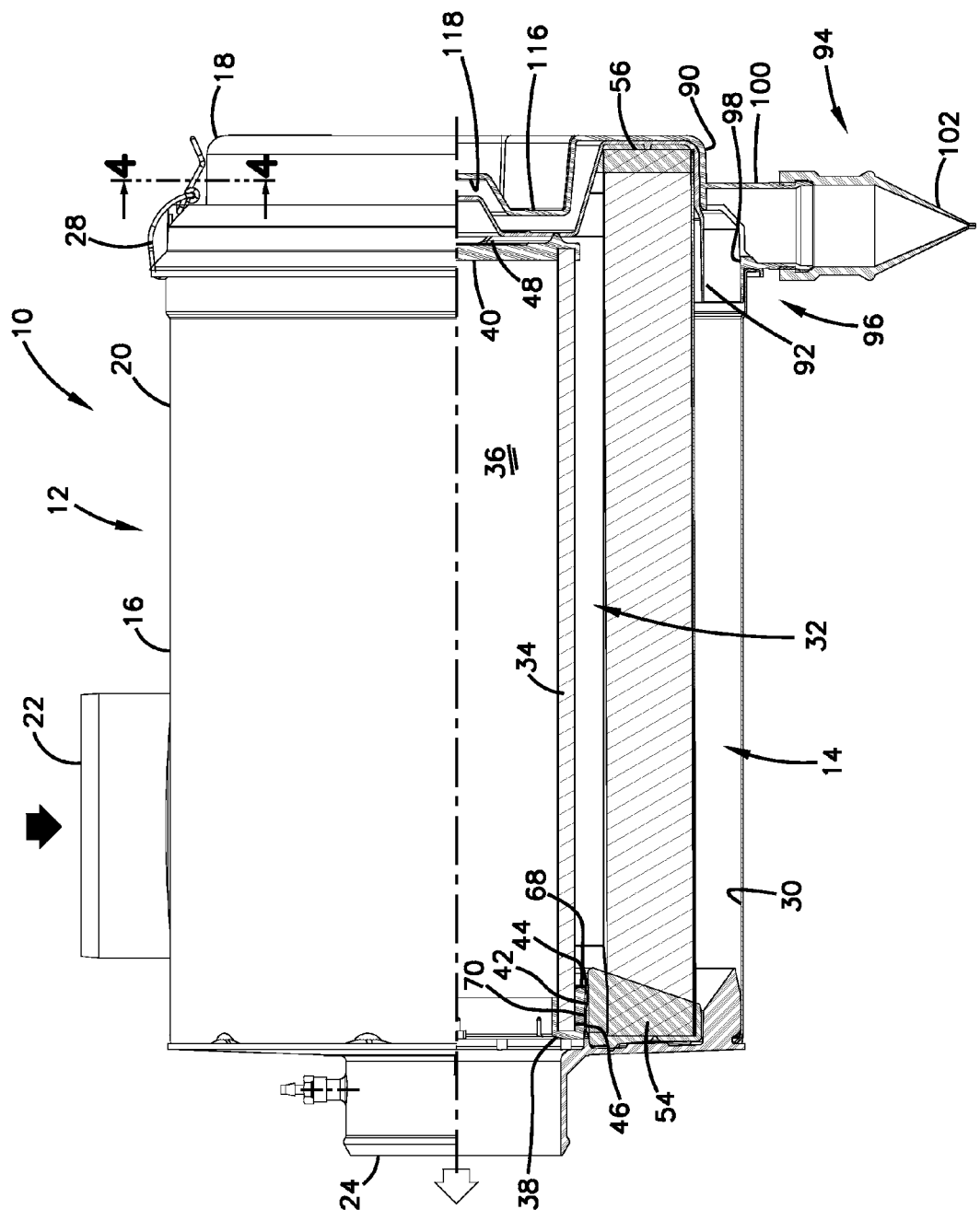
FIG. 3 is a cross-sectional view of the air cleaner depicted in FIG. 1, the cross-section being taken along the line 3-3 of FIG. 2.

In FIG. 3, a partial cross-sectional view of the air cleaner 10 is depicted. In reference now to FIG. 3, it can be seen that the body 16 defines an interior 30 of the air cleaner 10. Within the interior 30 for the particular air cleaner 10 depicted is positioned the filter element 14, through which air is directed during use. In this embodiment, there is also depicted an optional secondary or safety filter element 32.

Herein, the terms "filter element" or "element" refer to a removable, replaceable component that includes filter media through which the air being filtered passes, as the air is directed, from the inlet 22, through the interior 30, to the outlet 24, with the element 14 performing an air filtration (or dust removal) function. Unless otherwise stated, the terms "element", "filter element", and "filter" are meant to refer to a removable and replaceable component within the air cleaner 10. Preferably, filter elements are configured such that they can be removed and replaced by hand, at appropriate service intervals.

Herein, the term "primary element" generally refers to a filter element in which a majority of dust loading occurs during air cleaner use. In typical systems that have two elements, the primary element is positioned upstream from the safety element, during typical assembly. By "upstream" in this context, it is meant that due to filter element position, air cleaner configuration, and the location of seals during use, air generally must pass through the primary element before the air passes through the safety element when the air moves from the inlet 22 to the outlet 24.

Herein, the term "safety element" refers to a downstream element from the primary element. Typically, very little dust loading occurs on the safety element and generally occurs only as a result of either failure of some portion of the primary element or failure of a seal, or inadvertent dust movement during servicing of the primary element, or some other mishap.

The safety element 32 depicted in FIG. 3 includes a cylindrical extension of filter media 34 defining an open filter interior 36. The filter media 34 extends between an open end cap 38 and a closed end cap 40. The filter media 34 used in the safety element 32 can be pleated media, depth media, felt, or any type of media as determined appropriate by the designer of the air cleaner 10.

The safety element 32 is operably installed within the housing 12 to allow it to be sealed and occasionally removed and replaced with a new safety element 32. A seal 42 is depicted between the safety element 32 and the housing 12. While a number of different type of seals could be used, in the embodiment shown, the seal 42 depicted is a radial seal 44; specifically, an outwardly directed radial seal between the open end cap 38 and an internal wall 46 of the body 16.

In the embodiment shown, the closed end cap 40 of the safety element 32 is generally a flat disk 48. In some embodiments, the closed end cap 40 can include a projection that engages a portion of the primary element 14. An example of the engagement between the safety element 32 and the primary element 14 is shown in U.S. Pat. No. 6,652,614, incorporated by reference herein.

Figure 5:
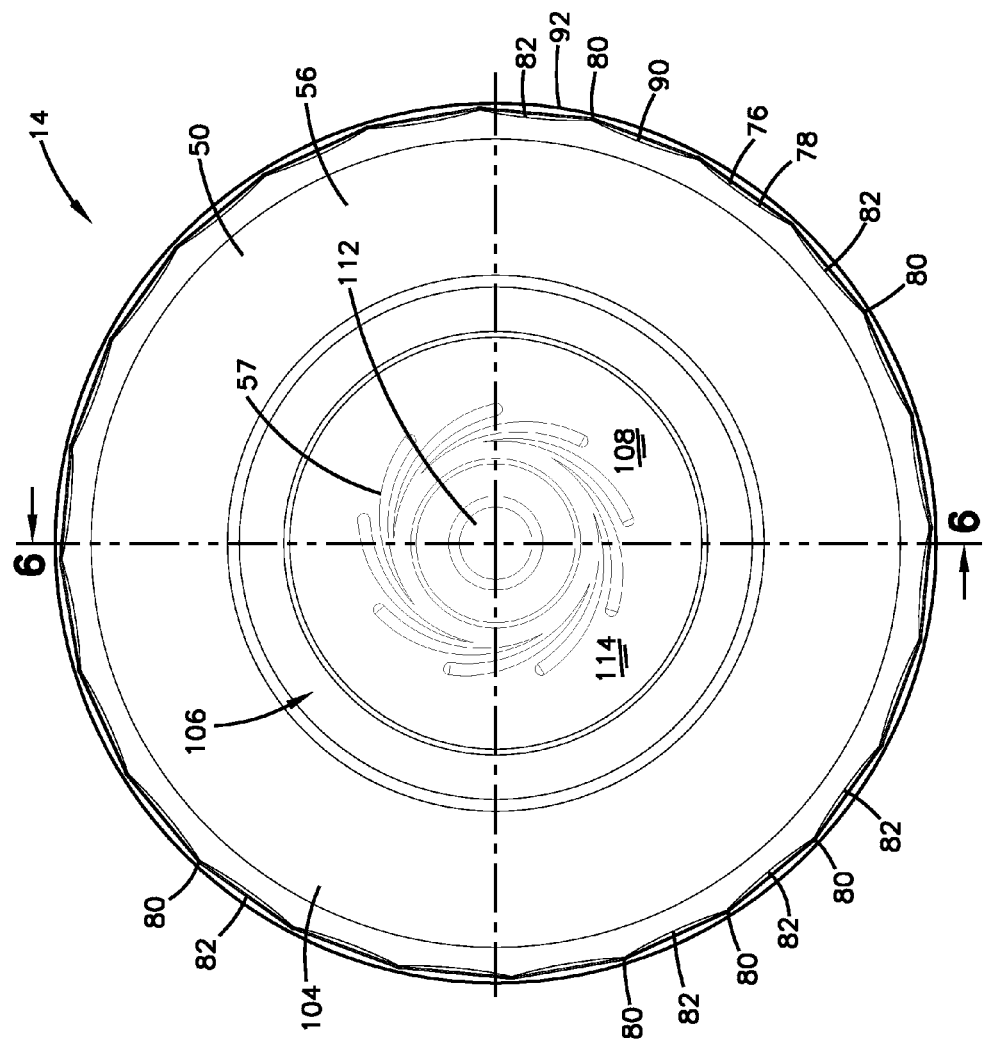
FIG. 5 is an end elevational view of the filter element used in the filter assembly of FIG. 1.
Figure 6:
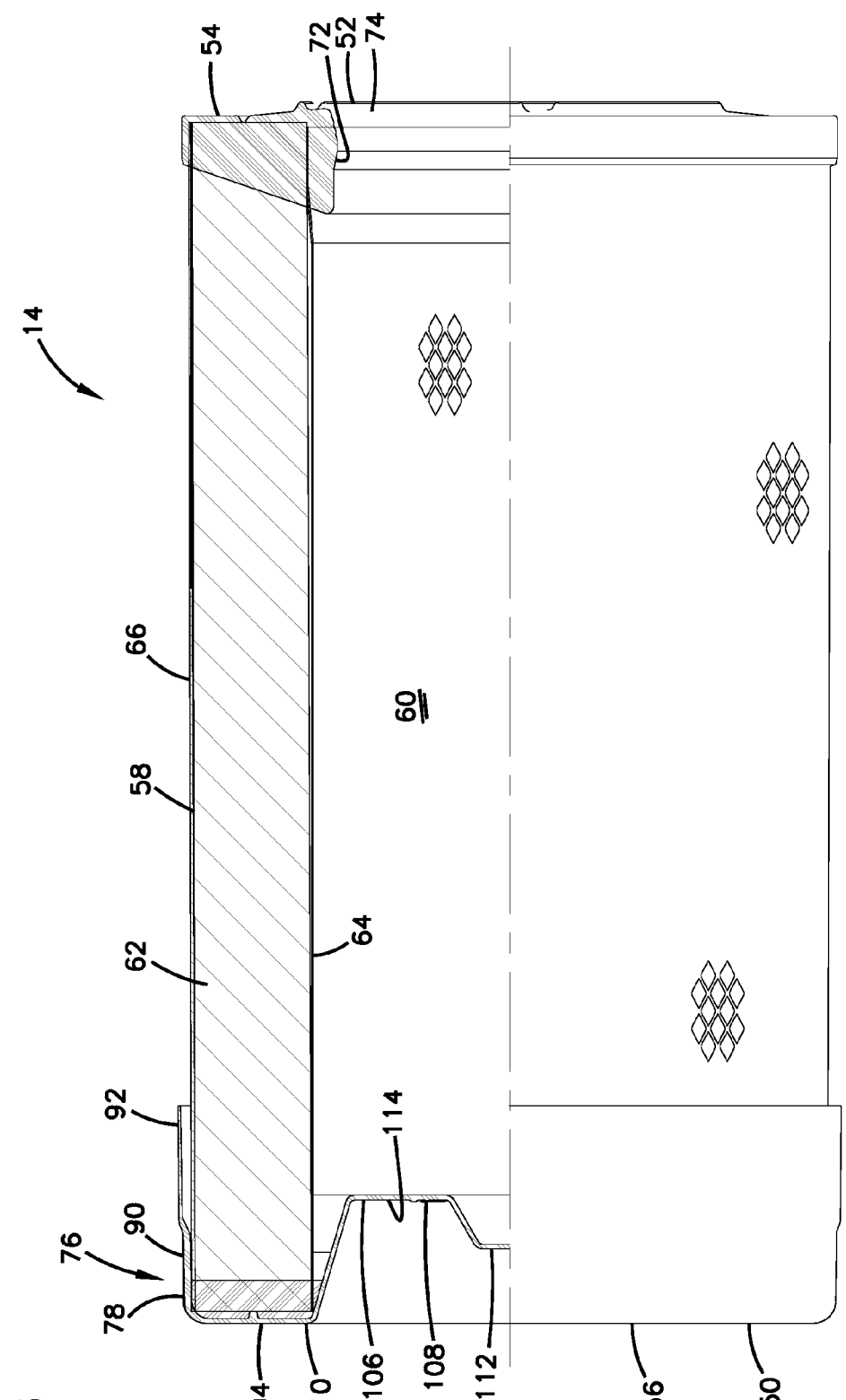
FIG. 6 is a cross-sectional view of the filter element depicted in FIG. 5, the cross-section being taken along the line 6-6 of FIG. 5.

In reference now to FIGS. 5-8, the filter element 14 is described in further detail. FIG. 5 shows an end view of the filter element 14 at its closed end. The element 14 depicted has closed end 50 and an open end 52 (FIG. 6). In the embodiment shown, the open end 52 is defined by a first end cap 54, while in the embodiment shown, the closed end 50 is defined by a second end cap 56. FIG. 5 also depicts ornamentation 57 to provide eye-catching, attractive qualities to the element 14. The particular ornamentation 57 is also distinctive to the patent assignee, Donaldson Company.

Extending between the first end cap 54 and second end cap 56 is a tubular extension of filter media 58. In the embodiment shown, the tubular extension of filter media 58 is cylindrical in shape, and in other embodiments, could be conical or oval, for example. The tubular extension of filter media 58 defines an open filter interior 60. In the embodiment shown in FIG. 3, the open filter interior 60 accommodates the safety element 32. Many different types of filter media 58 can be used. In the embodiment shown, the filter media 58 is depicted as pleated media 62. The pleated media 62 can be pleated paper or cellulose.

In the embodiment shown in FIG. 6, also extending between the first end cap 54 and second end cap 56 is an inner media support or liner 64. The inner liner 64 helps to support the media 58 due to operating pressures and other conditions. The inner liner 64 can be non-metal, or it may also be metal, such as an expanded metal.

In the particular embodiment shown in FIG. 6, also depicted extending between the first end cap and second end cap 56 is an outer filter support or outer liner 66. The outer liner 66 helps to support the filter media 58. The outer liner 66 can be non-metal, such as plastic; alternatively, it may be metallic, such as expanded metal. As can be appreciated from observing the embodiment of FIG. 6, the outer liner 66 circumscribes the filter media 58, and the filter media 58 circumscribes the inner liner 64.

The filter element 14 is releasably sealed to the housing 12 at seal 68 (FIG. 3). There are a variety of techniques for releasably sealing the filter element 14 to the housing 12. In the embodiment shown, a radial seal 70 is formed between the element 14 and the housing 12. Specifically, an internally directed radial seal 70 is formed between the first end cap 54 and the internal wall 46 of the housing body 16.

Figure 8:
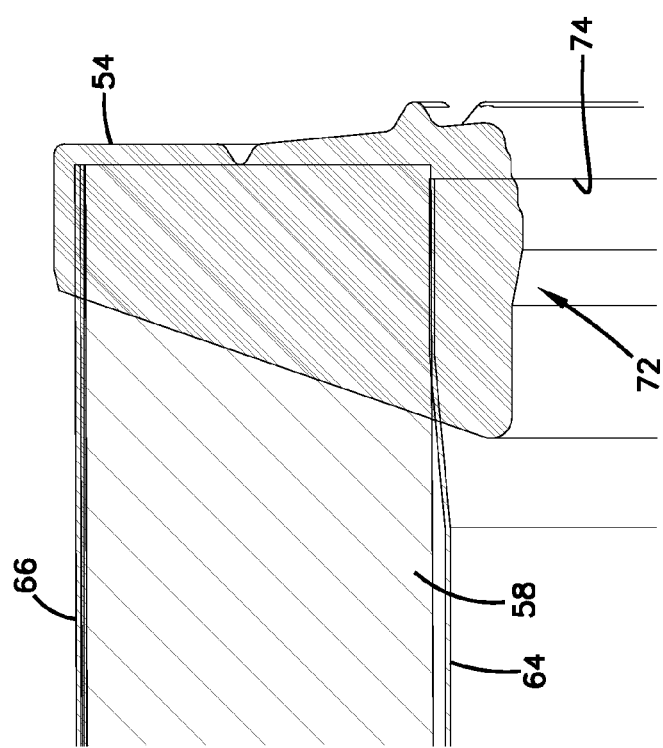
FIG. 8 is an enlarged cross-sectional view of the first end cap depicted in FIG. 6.

FIG. 8 shows an enlarged, cross-sectional of the first end cap 54. The first end cap 54 has a sealing portion 72 extending into opening 74 defined by the first end cap 54. In this embodiment, the sealing portion 72 comprises a soft, compressible foam polyurethane constructed and arranged to radially compress when the element 14 is mounted over the wall 46. The compression of the sealing portion 72 against the wall 46 forms the radial seal 70.

In accordance with principles of this disclosure, the cover 18 and the filter element 14 are constructed and arranged to rotationally interfere with each other by engagement between an inside surface of the cover 18 and an outer radial periphery of the filter element 14. This rotational interference with each other helps to inhibit internal rotation of the filter element 14 within the housing 12. One way of accomplishing this rotational interference is by having structure on the filter element 14 that is non-circular. In the embodiment shown in FIGS. 4, 6, and 7, the second end cap 56 of the filter element 14 includes an outer wall 76 circumscribing the tubular extension of filter media 58, and the outer wall 76 is non-circular. The outer wall 76 also forms an outer radial periphery 78 of the filter element 14.

Figure 4:
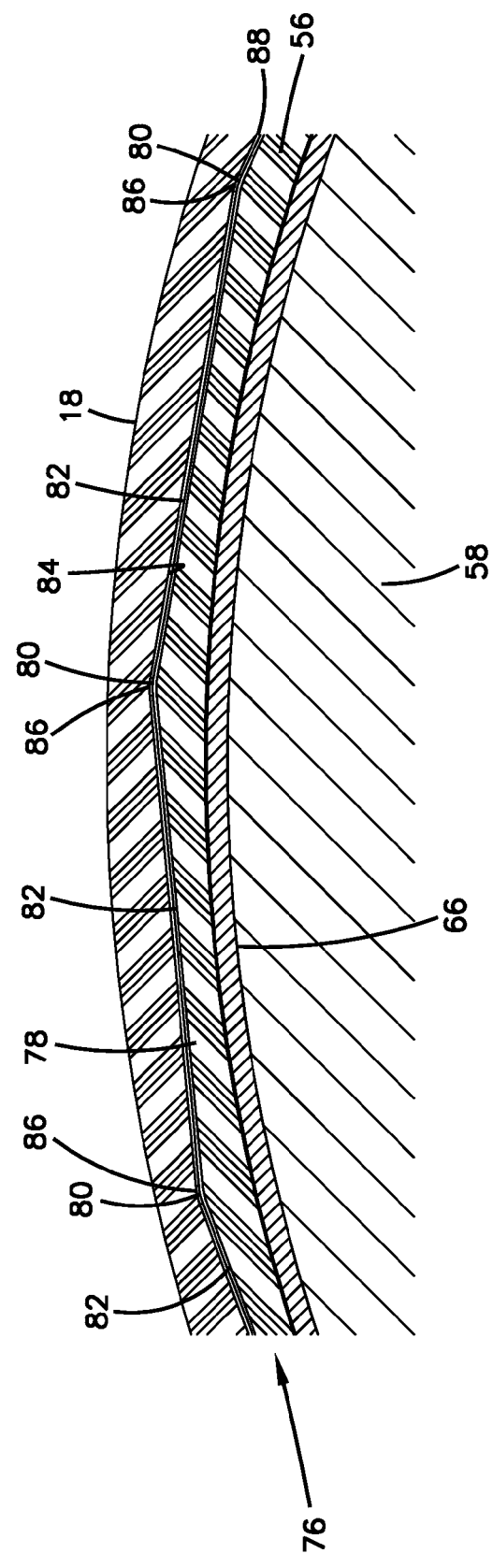
FIG. 4 is an enlarged cross-sectional view depicting the interface between the filter element and the housing cover, the cross-section being taken along the line 4-4 of FIG. 3.

Preferably, the non-circular outer wall 76 defines at least one apex 80 (FIG. 4). The at least one apex 80 cooperates with structure on the cover 18 to prevent the rotation of the element 14 within the housing 12. In the embodiment shown in FIG. 4, the outer wall 76 has a plurality of apices 80. The apices 80 can be irregularly spaced apart from each other, or uniformly spaced from each other. Between each apex 80 is a wall segment 82. The wall segments 82 can each be straight, to form a polygon shaped outer wall 76. Alternatively, the wall segments 82 can be curved. The wall segments 82 in the outer wall 76 can be a combination of straight and curved. In the particular embodiment depicted, the outer wall 76 has evenly spaced apices 80 with straight wall segments 82 therebetween to form a shape of a regular polygon.

The cover 18 has structure that cooperates with the outer radial periphery 78 of the element 14 to result in rotational interference between the cover 18 and the filter element 14. In the embodiment shown, the cover 18 has an inside surface 84 (FIG. 4 and FIG. 1) that engages the filter element outer radial periphery 78. The inside surface 84 will be non-circular. In preferred embodiments, the inside surface 84 will have at least one apex 86, and in the embodiment shown, has a plurality of apices 86. In preferred embodiments, the inside surface 84 will have an engagement surface 88 shaped to mate with the outer radial periphery 78. For example, while the outer radial periphery 78 is shown with outwardly projecting apices 80, the engagement surface 88 will have inwardly extending apices 86 to receive the outwardly extending apices 80.

In the embodiment shown, the inside surface 84 is polygon-shaped; specifically, a shape of a regular polygon. As can be seen in FIG. 4, because of the shape of the outer radial periphery 78 of the element 14 and the shape of the inside surface 84, each outwardly extending apex 80 of the filter element 14 is received by an inwardly extending apex 86 of the inside surface 84 of the cover 18. This engagement traps the element 14 relative to the cover 18 to prevent rotation of the cover 14 relative to the cover 18. The cover 18 is secured to the body 16 with latches 28, so the cover 18 is prevented from rotating relative to the body 16. As such, the element 14 is prevented from rotating relative to the overall housing 12, including both the body 16 and the cover 18.

Figure 7:
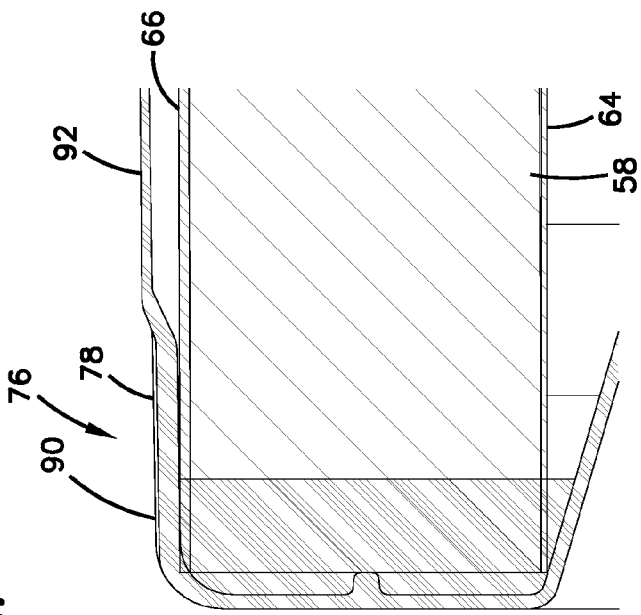
FIG. 7 is an enlarged cross-sectional view of the second end cap of the filter element depicted in FIG. 6.

In reference to FIGS. 6 and 7, in the embodiment shown, the outer wall 76 of the second end cap 56 has a first section 90 and a second section 92. The first section 90 corresponds to the outer radial periphery 78 defining the non-circular shape that engages against the inside surface 84 of the cover 18. The second section 92 extends from the first section 90. In the embodiment shown, the first section 90 is immediately adjacent to the closed end 50, while the second section 92 extends from the first section 90 and is separated from the closed end 50 by the first section 90. In the embodiment shown in FIG. 7, the first section 90 is pressed against the outer liner 66, while the second section 92 is spaced radially away from the outer liner 66 and the filter media 58. The second section 92 can have the same shape as the first section 90, or it can have the same shape as the filter media 58, such as cylindrical (a circular cross-section).

The second section 92 is part of a pre-cleaner for the air cleaner 10. Specifically, and in reference now to FIG. 3, the air cleaner 10 has a dust ejector 94 as part of the housing 12; in particular, as part of the cover 18. Air to be filtered enters the housing 12 through the inlet 22, and the pre-cleaner 96 (FIG. 3) helps to separate out large dust particles and eject them through the dust ejector 94 before they reach the primary element 14. Specifically, the second section 92 of the outer wall 76 allows inlet air to circumferentially rotate or swirl around the second section 92. This rotation of the air around the second section 92 creates centrifugal forces that cause dust particles to drop to the bottom 98 of the housing 12, where they flow through an ejector outlet 100 in the cover 18 and then through an evacuation valve 102.

In reference again to FIG. 6, the second end cap 56 depicted includes an axial portion 104 generally perpendicular to the outer wall 76. The axial portion 104 has a central region 106 with a closed recess 108 projecting into the open filter interior 60. The closed recess extends at least 30 mm, preferably 40-80 mm axially from the uppermost portion 110 of the closed end 50. In the embodiment shown, the central region 106 further includes a projection 112 extending axially from the central region 106. In the embodiment shown, the projection 112 extends at least 10 mm, for example 12-30 mm from an innermost portion 114 of the closed recess 108.

In the embodiment shown, the cover 18 includes structure to mate with the second end cap 56 to help laterally support the filter element 14 in an operable position in the housing 12 with the radial seal 70 in place. In the embodiment shown in FIG. 3, the cover 18 includes a protrusion 116 projecting into the closed recess 108 of the second end cap 56. Preferably, the cover 18 also defines a recess 118 oriented to receive the projection 112 of the second end cap 56. As can be seen in FIG. 3, when the protrusion 116 is received within the closed recess 108, and when the projection 112 is received by the recess 118, this will help keep the filter element 14 in place mounted on the wall 46 with the radial seal 70 in place.

To install the filter element 14 into the housing 12, the filter element 14 will be operably oriented into the housing body 16. This will include forming the seal 68 between the element 14 and the housing 12. In the example shown, radial seal 70 is formed by compressing the first end cap 54 between and against the outer liner 66 and the wall 46 of the housing. Next, the cover 18 is oriented over the element 14 and the open end 26 of the body 16. The step of orienting the cover 18 over the element 14 and the housing body 16 includes engaging the cover inside surface 84 and the filter element outer radial periphery 78 to rotationally interfere with each other. For example, the second end cap 56 of the filter element 14 has outer wall 76 with at least one apex 80. The at least one apex 80 is aligned with an oppositely oriented apex 86 on the cover inside surface 84. In the example shown in FIG. 4, the step of engaging the cover inside surface 84 and the filter element outer radial periphery 78 includes engaging a regular polygon shape on the outer wall 76 against a regular polygon shape on the cover inside surface 84.

To service the air cleaner 10, the cover 18 is removed from the body 16 by releasing the latches 28. The filter element 14 is then grasped and pulled through the open end 26 of the body 16. This releases the radial seal 70. The filter element 14 is then discarded. If a safety element 32 is being used, removing the element 14 from the body 16 will expose the safety element 32. If desired, the safety element 32 can also be removed from the body 16 and pulled through the open end 26 by releasing the radial seal 44. A new safety element 32 can then be installed by orienting it through the open end 26 of the body 16 and forming radial seal 44. Next, a new filter element 14 is provided and installed in the body 16 by placing the open filter interior 60 over the safety element 32 and then forming the radial seal 70 by compressing the first end cap 54 sealing portion 72 against the housing wall 46 to form the radial seal 70. The filter element 14 is then rotationally locked relative to the cover 18 by orienting the cover 18 over the element 14 and engaging the outer radial periphery 78 relative to the inside surface 84 of the cover 18. The latches 28 are then engaged to secure the cover 18 relative to the housing 12.

FIGS. 10-17 illustrate a second embodiment of an interface arrangement between a filter element 214 and a cover 218. Other than certain specific structural differences, discussed below, the element 214 is structurally identical as the described embodiment of element 14, and the cover 218 is structurally identical to the cover 18.

Figure 14:
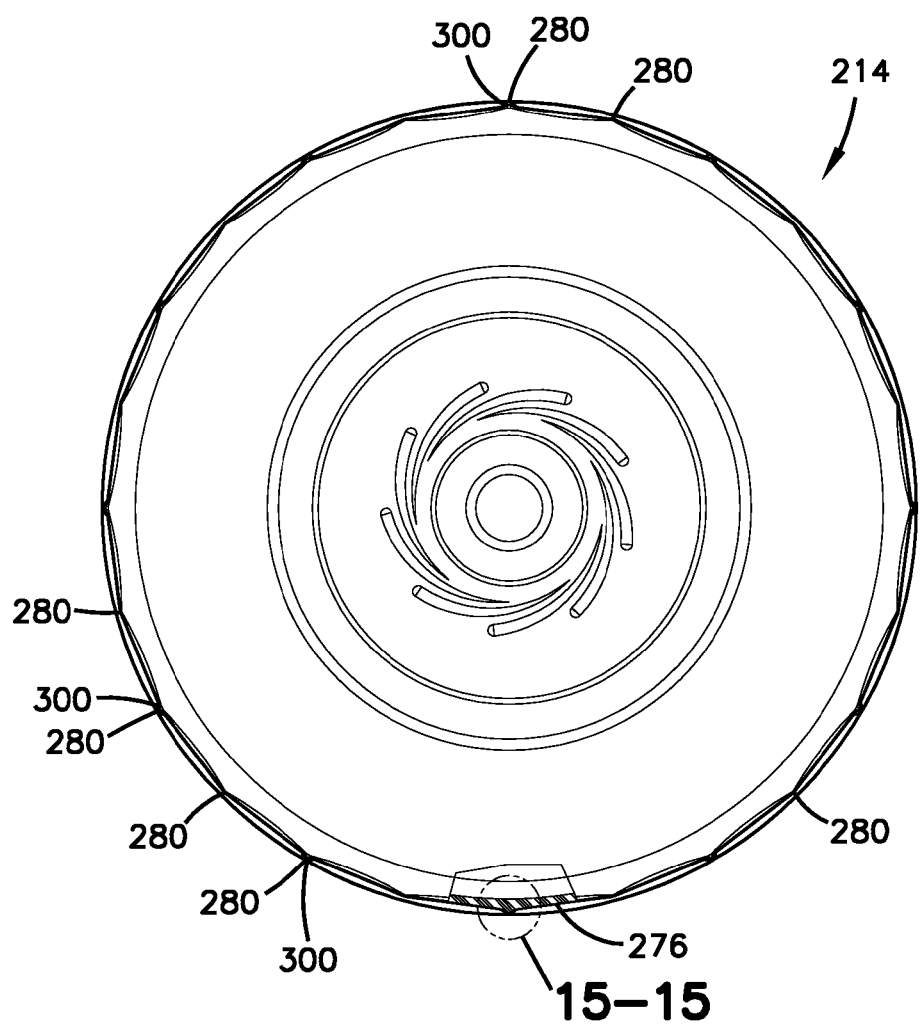
FIG. 14 is an end elevational view, with a portion broken away, of the filter element depicted in FIG. 10.
Figure 15:
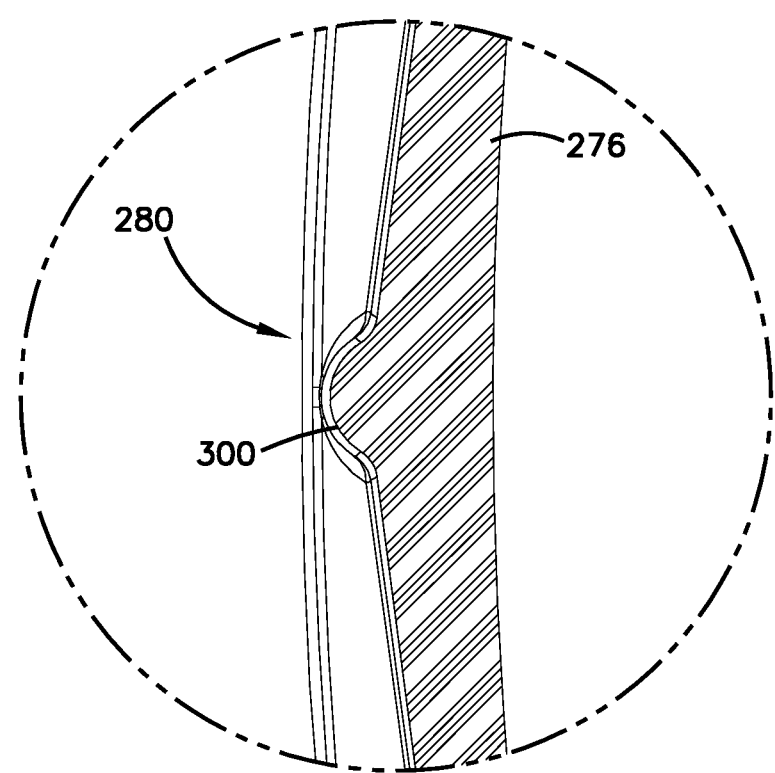
FIG. 15 is an enlarged cross-sectional view of a portion of the filter element, the cross-section being taken along the section 15-15 of FIG. 14.

In FIGS. 10-13, the filter element 214 is depicted as operably mounted within the cover 218. FIGS. 14 and 15 depict the filter element 214, and FIGS. 16 and 17 depict the cover 218.

Figure 11:
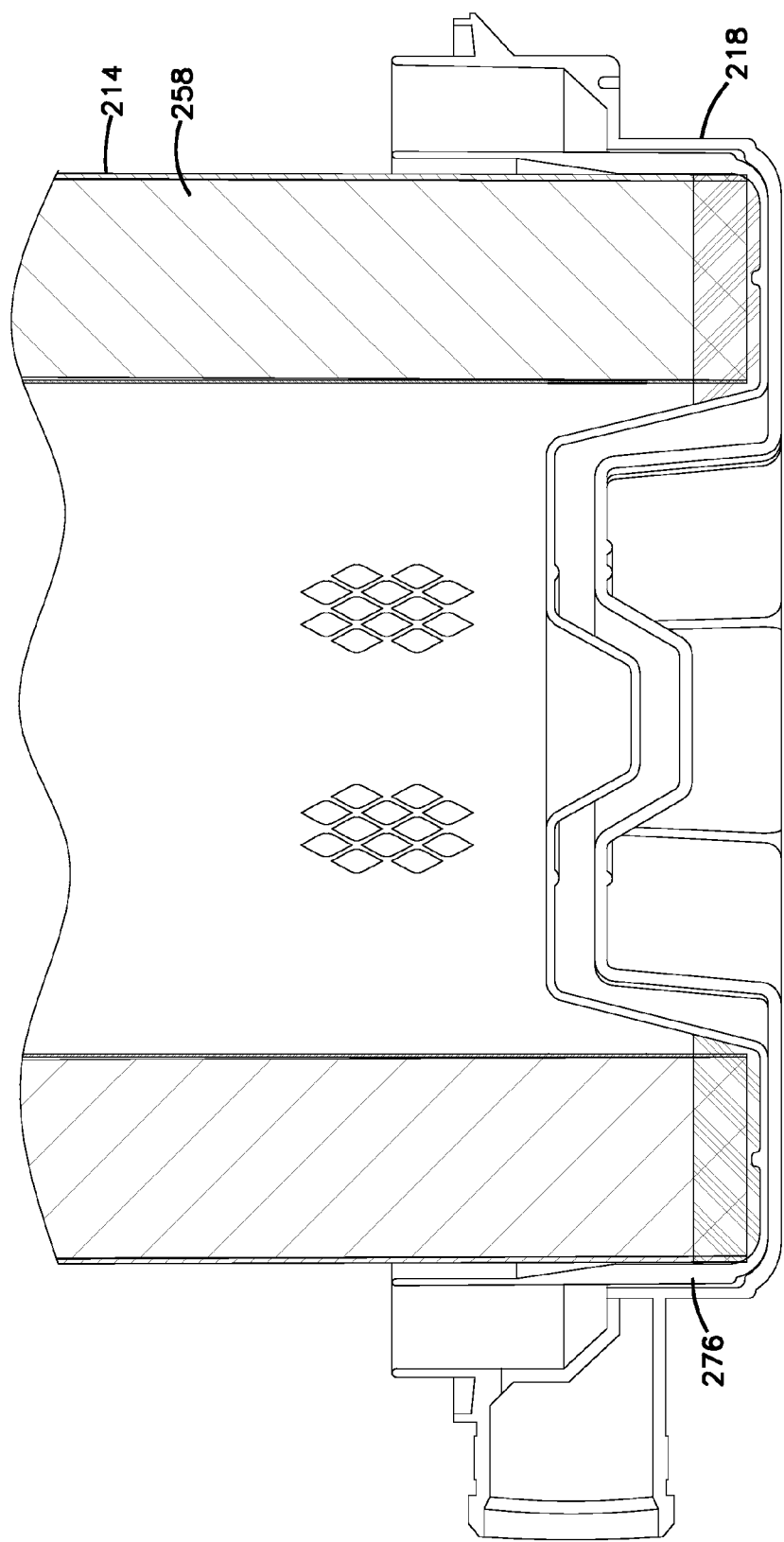
FIG. 11 is a schematic, cross-sectional view of the element installed in the cover, the cross-section being taken along the line 11-11 of FIG. 10.
Figure 12:
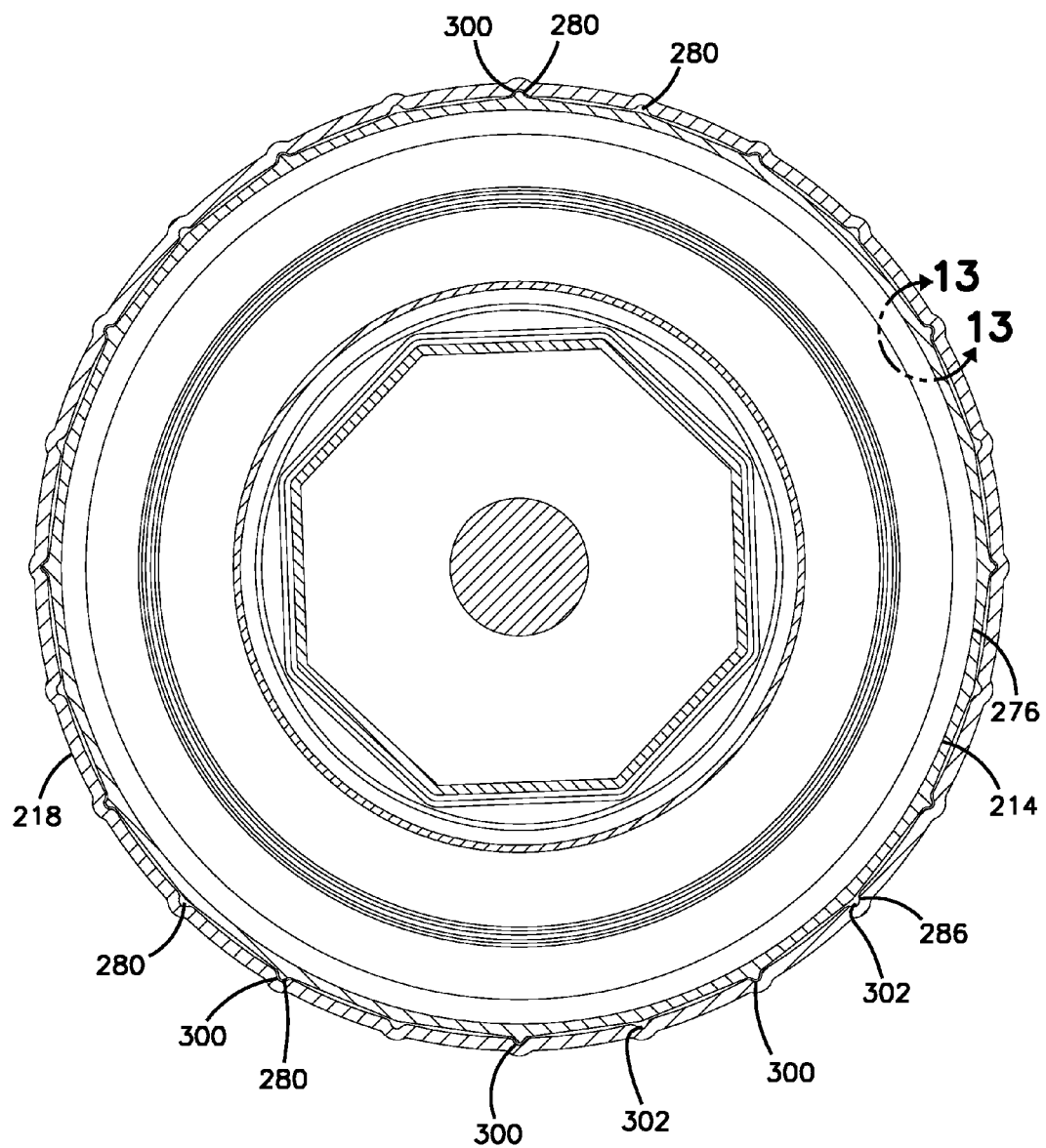
FIG. 12 is a schematic, cross-sectional view showing the interface between the filter element and housing cover, the cross-section being taken along the line 12-12 of FIG. 10.
Figure 13:
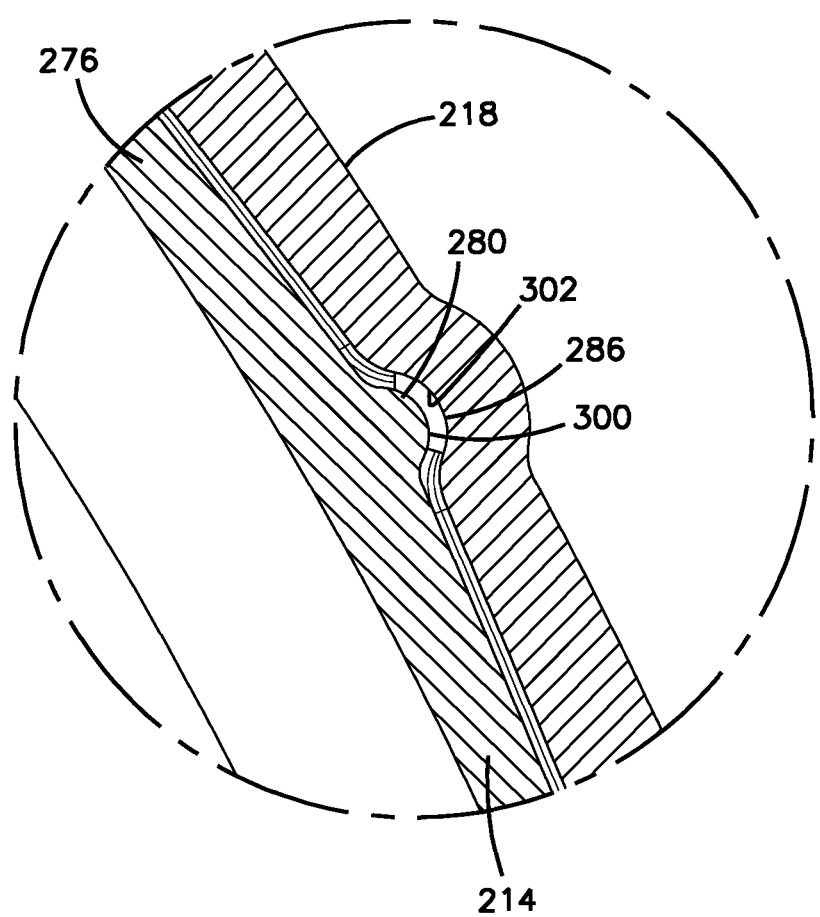
FIG. 13 is an enlarged cross-sectional view of a portion of the interface between the filter element and the housing cover taken at section 13-13 of FIG. 12.

As with the embodiment of FIGS. 1-9, the filter element 214 has an outer wall 276 that circumscribes a tubular extension of filter media 258 (FIG. 11). Again, as with the embodiment of FIGS. 1-11, the outer wall 276 defines at least one apex 280, and preferably, a plurality of apices 280. In the embodiment of FIGS. 10-15, the outer wall 276 includes at least one rib 300 projecting therefrom. In preferred embodiments, the at least one rib 300 includes a plurality of ribs 300 projecting from the outer wall 276. In the preferred implementation illustrated in FIGS. 10-15, the number of ribs 300 is fewer in number than the number of apices 280. In the embodiment shown, each of the ribs 300 is aligned with a respective one of the plurality of apices 280. In the preferred embodiment shown, every other apex 280 includes a rib 300 aligned therewith. The purpose of the ribs 300 will be described further below.

Figure 16:
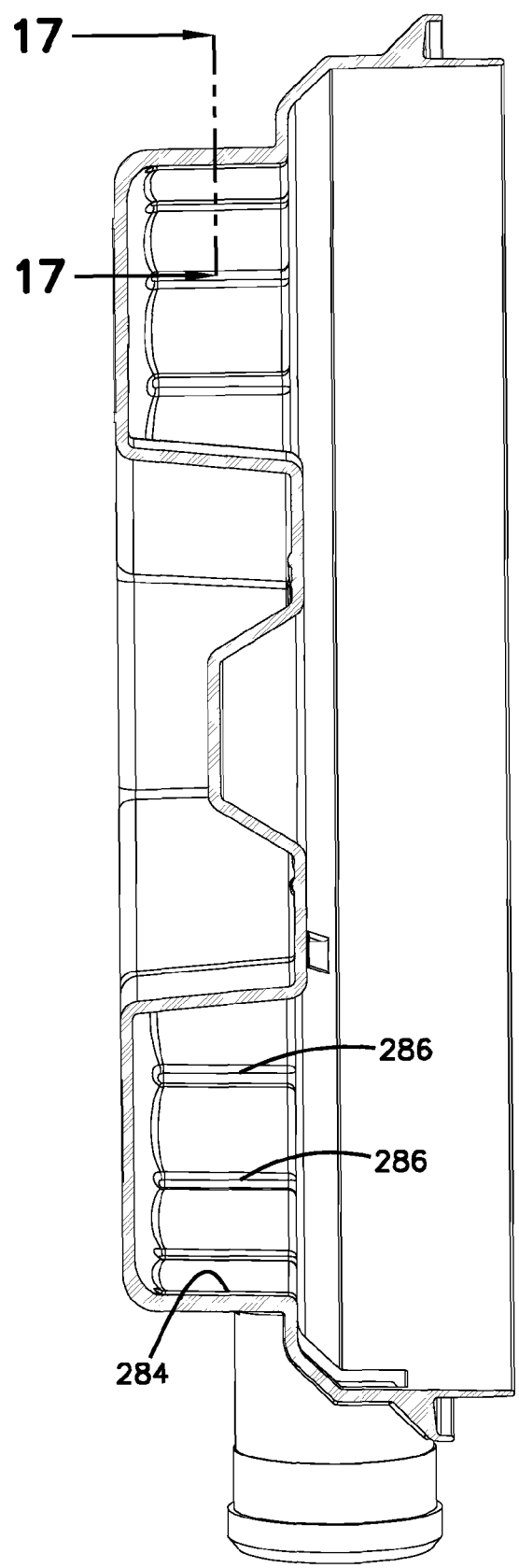
FIG. 16 is a cross-sectional view of the cover depicted in FIG. 10.
Figure 17:
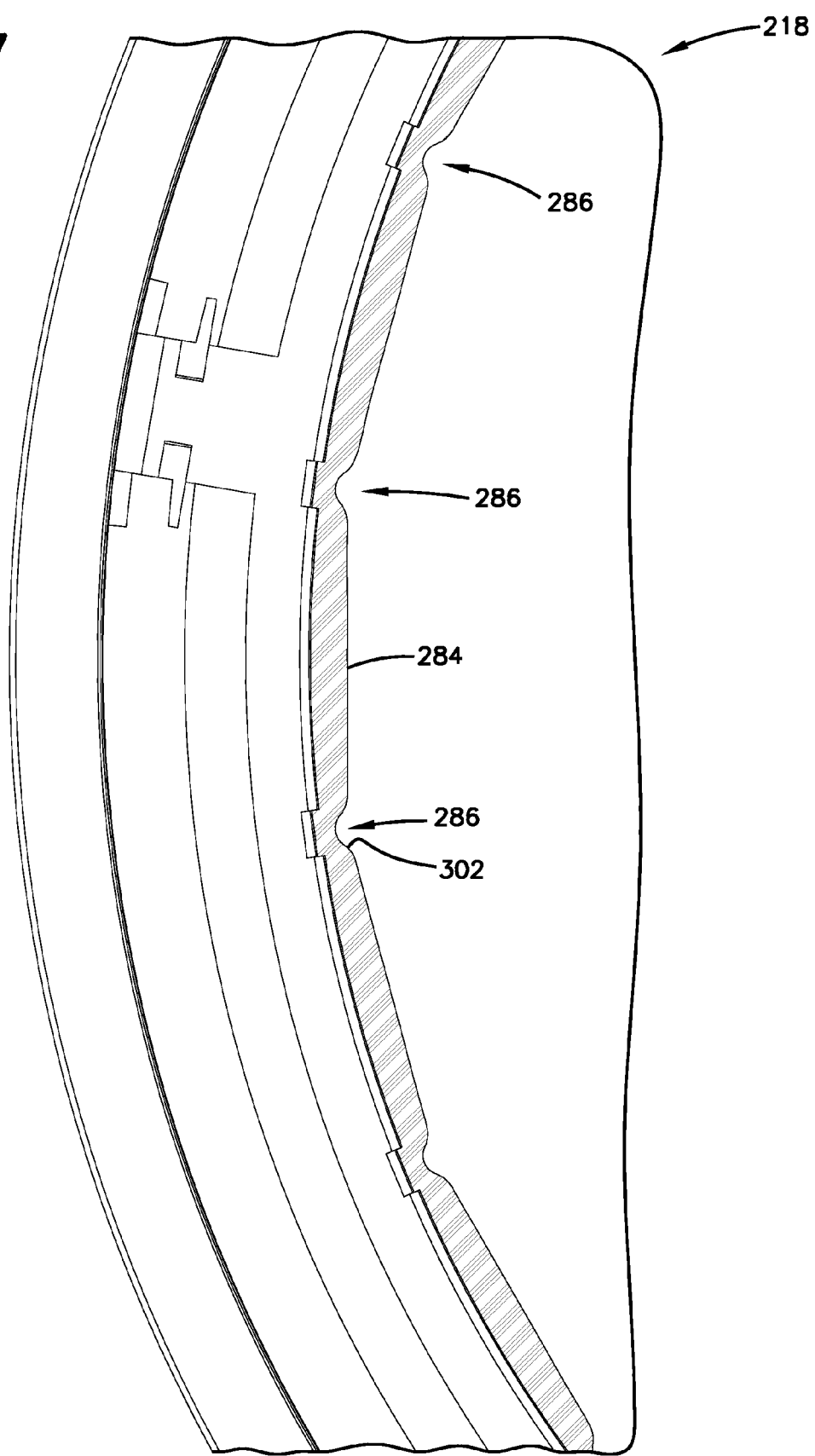
FIG. 17 is a cross-sectional view of a portion of the cover of FIG. 16, the cross-section being taken along the line 17-17 of FIG. 16.

In reference now to FIGS. 16 and 17, the cover 218 is illustrated. The cover 218 has identical structure as the cover 18, with the exception of venting slots 302. As with the embodiment of FIGS. 1-9, the cover 218 has a cover inside surface 284, which is non-circular. The cover inside surface 284, as with the embodiment of FIGS. 1-9, defines at least one apex 286, and preferably, a plurality of apices 286. Each apex 286, in the embodiment shown, is evenly spaced around the inside surface 284 of the cover 218. In the embodiment of FIGS. 10-17, the cover inside surface 284 also defines at least one venting slot 302. In the embodiment shown, the at least one venting slot 302 is aligned with at least one of the plurality of apices 286 in the cover inside surface 284. Preferably, and in the embodiment shown, there are a plurality of venting slots 302, with one respective venting slot 302 aligned with a respective one of the apices 286 in the cover inside surface 284.

In use, when the element 214 is assembled with the cover 218, the venting slots 302 help to allow air to escape or enter the volume between the element 214 and the cover 218 when installing or retrieving the cover 218. Without the venting slots 302, air can get trapped between the cover 218 and element 214. Without the venting slots 302, when removing the surface cover 218 from the element 214, a vacuum could be created because the volume between the cover 218 and element 214 is only slowly filled with air. The venting slots 302 allow air to escape or enter the volume between the element 214 and cover 218.

In addition, at least some of the venting slots 302 operate to receive the ribs 300 in the element 214. In the embodiment of FIGS. 1-9, without the ribs 300, it can sometimes be possible to push the service cover 18 onto the air cleaner over the element 14 into a closed position and engage the latches. This results in that the element 14 is mechanically "locked" in the service cover 18. When taking the service cover 18 off, the element 14 remains stuck in the cover 18 and is difficult to remove from the cover 18. The ribs 300 at the element apices 280 prevent the element 214 from being forced into place when its apices 280 are misaligned with respect to the apices 286 of the cover 218. In the example embodiment illustrated, ribs 300 are on every other apex 280 in order to keep the venting function of the venting slots 302.

What is claimed is:
1. A filter element comprising:
(a) a tubular extension of filter media defining an open filter interior;
  (i) the tubular extension of media comprises a cylindrical extension of pleated media;
(b) a first end cap secured to the tubular extension of filter media; the first end cap having an opening in communication with the open filter interior; the first end cap including a sealing portion;

(i) the sealing portion extending radially into the opening and constructed and arranged to form a radial seal with a housing body, when the filter element is operably installed in a housing body;
(c) a second end cap secured to the tubular extension of filter media opposite of the first end cap; the second end cap being a closed end cap with no openings therethrough;
(i) the second end cap including an outer wall circumscribing the tubular extension of filter media; the outer wall being non-circular and including a plurality of first protrusions radially projecting from the outer wall and a plurality of second protrusions radially projecting from the outer wall; the first protrusions projecting further from the outer wall than the second protrusions.

2. A filter element according to claim 1 wherein the outer wall further includes a plurality of curved wall segments.

3. A filter element according to claim 1 wherein second protrusions include at least one apex.

4. A filter element according to claim 1 wherein the second protrusion comprise a plurality of apices.

5. A filter element according to claim 4 wherein each of the second protrusions alternates with one of the first protrusions.

6. A filter element according to claim 1 wherein each of the second protrusions alternates with one of the first protrusions.

7. A filter element according to claim 1 wherein:
(a) the filter element further includes an inner liner and an outer liner with the cylindrical extension of pleated media therebetween.

8. An air cleaner assembly comprising a filter element according to claim 1; the air cleaner assembly including:
(a) a housing body;
(b) a separate cover removable from the housing body; and
(c) the filter element removably positioned in the housing body with the sealing portion forming a radial seal with the housing body.

9. An air cleaner assembly according to claim 8 wherein:
(a) the cover is mounted over the housing body and the filter element;
(b) the cover has an inside surface defining a plurality of apices; and
(c) the cover and the filter element rotationally interfere with each other by engagement between the cover inside surface and the filter element outer wall.

10. An air cleaner assembly according to claim 9 wherein:
(a) the cover inside surface defines at least one venting slot aligned with at least one of the plurality of apices in the cover inside surface.

* * * * *

UNITED STATES PATENT AND TRADEMARK OFFICE
CERTIFICATE OF CORRECTION

| | | |
|---|---|---|
| PATENT NO. | : 8,753,415 B2 | Page 1 of 1 |
| APPLICATION NO. | : 13/897808 | |
| DATED | : June 17, 2014 | |
| INVENTOR(S) | : Coulonvaux et al. | |

It is certified that error appears in the above-identified patent and that said Letters Patent is hereby corrected as shown below:

Title page, the Foreign Application Priority Data: Insert
item --(30) Foreign Application Priority Data
 Aug. 16, 2005     (EP)    05107531.5--

Signed and Sealed this
Seventh Day of April, 2015

Michelle K. Lee
*Director of the United States Patent and Trademark Office*